(12) United States Patent
Chun et al.

(10) Patent No.: US 11,501,770 B2
(45) Date of Patent: Nov. 15, 2022

(54) SYSTEM, SERVER, AND METHOD FOR SPEECH RECOGNITION OF HOME APPLIANCE

(71) Applicant: Samsung Electronics Co., Ltd, Suwon-si (KR)

(72) Inventors: Eun Jin Chun, Suwon-si (KR); Woo Cheol Shin, Cheongju-si (KR); Nam Gook Cho, Suwon-si (KR); Young Soo Do, Yongin-si (KR); Min Hyung Lee, Seoul (KR); Pil Soo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 16/643,469

(22) PCT Filed: Aug. 29, 2018

(86) PCT No.: PCT/KR2018/010007
§ 371 (c)(1),
(2) Date: Feb. 28, 2020

(87) PCT Pub. No.: WO2019/045455
PCT Pub. Date: Mar. 7, 2019

(65) Prior Publication Data
US 2021/0005191 A1   Jan. 7, 2021

(30) Foreign Application Priority Data

Aug. 31, 2017   (KR) ........................ 10-2017-0111492

(51) Int. Cl.
*G10L 15/22*   (2006.01)
*G10L 15/18*   (2013.01)
*G10L 15/30*   (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
CPC ......................................... G10L 15/00–15/34
See application file for complete search history.

(56) References Cited

U.S. PATENT DOCUMENTS 6,330,539 B1\* 12/2001 Takayama ........... G10L 15/1822
    704/275
8,032,383 B1\* 10/2011 Bhardwaj ............... G10L 15/30
    704/235

(Continued)

FOREIGN PATENT DOCUMENTS

JP   2002-258892 A   9/2002
JP   2016-130800 A   7/2016

(Continued)

OTHER PUBLICATIONS

Supplementary European Search Report dated Apr. 28, 2020 in connection with European Patent Application No. 18 85 2416, 7 pages.

(Continued)

*Primary Examiner* — Abul K Azad

(57) ABSTRACT

Provided is a system, server, and method for speech recognition capable of collectively setting a plurality of setting items for device control through an utterance of a single sentence provided in the form of natural language. The system includes: a home appliance configured to receive a speech command that is generated through an utterance of a single sentence for control of the home appliance; and a server configured to receive the speech command in the (Continued)

single sentence from the home appliance and interpret the speech command of the single sentence through multiple intent determination.

2 Claims, 11 Drawing Sheets

(56) References Cited

U.S. PATENT DOCUMENTS

| | | | | |
|---|---|---|---|---|
| 8,219,409 | B2* | 7/2012 | Vetterli | G10L 19/008 |
| | | | | 704/211 |
| 9,390,716 | B2* | 7/2016 | Nakano | G10L 17/22 |
| 10,089,072 | B2* | 10/2018 | Piersol | G06F 3/167 |
| 10,789,948 | B1* | 9/2020 | Klein | G10L 15/30 |
| 2006/0287854 | A1 | 12/2006 | Smolenski et al. | |
| 2014/0188463 | A1* | 7/2014 | Noh | G10L 15/00 |
| | | | | 704/201 |
| 2014/0244258 | A1* | 8/2014 | Song | G10L 15/18 |
| | | | | 704/249 |
| 2015/0276254 | A1 | 10/2015 | Nemcek et al. | |
| 2015/0379993 | A1 | 12/2015 | Subhojit et al. | |
| 2017/0019362 | A1* | 1/2017 | Kim | H04L 51/10 |
| 2018/0093814 | A1* | 4/2018 | Espinosa | A23L 3/28 |
| 2018/0286407 | A1* | 10/2018 | Katoh | G10L 15/083 |

FOREIGN PATENT DOCUMENTS

| | | |
|---|---|---|
| KR | 10-1383552 B1 | 4/2014 |
| KR | 10-1465230 B1 | 11/2014 |
| KR | 10-2016-0001965 A | 1/2016 |
| KR | 10-2017-0000722 A | 1/2017 |

OTHER PUBLICATIONS

Communication pursuant to Article 94(3) EPC dated Dec. 9, 2020 in connection with European Application No. 18852416.9, 5 pages.
International Search Report dated Jan. 29, 2019 in connection with International Patent Application No. PCT/KR2018/010007, 2 pages.
Summons to attend oral proceedings pursuant to Rule 115(1) EPC dated Sep. 21, 2021 in connection with European Patent Application No. 18 852 416.9, 7 pages.
Notice of Preliminary Rejection dated Sep. 27, 2021 in connection with Korean Patent Application No. 10-2017-0111492, 8 pages.

* cited by examiner

FIG. 4

START WITH STANDARD WASHING COURSE,
THREE TIMES OF RINSING, AND DELICATE DRYING

| FUNCTION | OPTION | H/W CONTROL VALUE |
|---|---|---|
| COURSE | STANDARD WASHING | 0x00 |
| RINSING | THREE TIMES | 0x0F |
| DRYING | DELICATE | 0xA0 |
| OPERATION CONTROL | START WASHING | 0x43 |

SYSTEM, SERVER, AND METHOD FOR SPEECH RECOGNITION OF HOME APPLIANCE

CROSS-REFERENCE TO RELATED APPLICATIONS

This application is a 371 of International Application No. PCT/KR2018/010007 filed Aug. 29, 2018, which claims priority to Korean Patent Application No. 10-2017-0111492 filed Aug. 31, 2017, the disclosures of which are herein incorporated by reference in their entirety.

1. FIELD

The disclosure relates to a speech recognition technology for controlling a home appliance using a speech command generated by a user (a speaker)'s utterance.

2. DESCRIPTION OF RELATED ART

In order to control home appliances and perform a desired operation (a function), a plurality of operation conditions are set. As the functions provided by home appliances become complex and diverse, the operation conditions to be set also increase. In the case of a washing machine, for example, in order to change the number of rinsing operations or the water level according to the weight of laundry in each washing course, a number of times of key manipulation on a control panel are required. However, in many cases, such a key manipulation is too complicated to be understood without reading a user guidebook. In addition, as for some functions, the setting method is greatly inconvenient and thus users may give up using the functions.

In order to remove such a constraint, a speech command system based on speech recognition technology is increasingly used. However, even in the case of the speech command system based on speech recognition technology, when there are a number of setting items, the speech command needs to be generated as many times as the number of setting items so as to set each setting item.

Therefore, it is an object of the disclosure to provide a system, server, and method for speech recognition of a home appliance that are capable of collectively setting a plurality of setting items for device control through an utterance of a single sentence in the form of natural language.

SUMMARY

According to an aspect of the present disclosure, there is provided a speech recognition system for a home appliance, including: a home appliance configured to receive a speech command that is generated through an utterance of a single sentence for control of the home appliance; and a server configured to receive the speech command in the single sentence from the home appliance and interpret the speech command in the single sentence through multiple intent determination.

The speech command generated through the utterance of the single sentence may include a plurality of intents, and the server interprets the speech command on the basis of the plurality of intents.

The server may be configured to: generate a plurality of instruction sentence formulas by combining the plurality of intents; generate a plurality of derivative sentences on the basis of the plurality of instruction sentence formulas; and compare the plurality of derivative sentences with a plurality of pieces of speech command data registered in the server, to find matching speech command data in the comparison.

The server may be configured to: generate a plurality of scenarios operable by the home appliance on the basis of a function and a specification of the home appliance; and generate the plurality of instruction sentence formulas each corresponding to one of the plurality of scenarios.

The server may be configured to, in the comparing of the plurality of derivative sentences with the plurality of pieces of speech command data registered in the server, compare the speech command data having a higher priority first.

The speech command data representing an operation having a higher frequency of use may be assigned a higher priority.

The server may be configured to: extract a plurality of control values for controlling the home appliance from a result of the interpretation of the speech command; and transmit a speech recognition result including the plurality of control values to the home appliance, wherein the speech recognition result includes at least one of a function and an option of the home appliance, a hardware value of the home appliance, a value required for control of the home appliance, information indicating whether the speech recognition result is successful, or text information guided to a user.

The home appliance may include at least one of a refrigerator, a washing machine, a cooking device, an air conditioner, or a robot cleaner.

According to another aspect of the present disclosure, there is provided a speech recognition server for a home appliance, including: a speech recognizer configured to recognize a speech command generated through an utterance of a single sentence for control of the home appliance and convert the speech command into text data; and a natural language interpreter configured to analyze the speech command in the single sentence and extract an intent, wherein the speech recognition server interprets the speech command in the single sentence through multiple intent determination.

The speech command generated through the utterance of the single sentence may include a plurality of intents, and the speech recognition server may interpret the speech command on the basis of the plurality of intents.

The speech recognition server may be configured to: generate a plurality of instruction sentence formulas by combining the plurality of intents; generate a plurality of derivative sentences on the basis of the plurality of instruction sentence formulas; and compare the plurality of derivative sentences with a plurality of speech commands registered in the server, to find a matching speech command in the comparison.

The speech recognition server may be configured to: generate a plurality of scenarios operable by the home appliance on the basis of a function and a specification of the home appliance; and generate the plurality of instruction sentence formulas each corresponding to one of the plurality of scenarios.

The speech recognition server may be configured to, in the comparing of the plurality of derivative sentences with the plurality of speech commands registered in the server, compare speech command data having a higher priority first.

The speech command data representing an operation having a higher frequency of use may be assigned a higher priority.

The speech recognition server may be configured to: extract a plurality of control values for controlling the home appliance from a result of the interpretation of the speech command; and transmit a speech recognition result including the plurality of control values to the home appliance, The speech recognition result may include at least one of a function and an option of the home appliance, a hardware value of the home appliance, a value required for control of the home appliance, information indicating whether the speech recognition result is successful, or text information guided to a user.

The home appliance may include at least one of a refrigerator, a washing machine, a cooking device, an air conditioner, or a robot cleaner.

According to another aspect of the present disclosure, there is provided a speech recognition method for a home appliance, including: receiving a speech command generated through an utterance of a single sentence for control of a home appliance; and receiving the speech command in the single sentence from the home appliance and interpreting the speech command in the single sentence through multiple intent determination.

The speech command generated through the utterance of the single sentence may include a plurality of intents, and the speech command is interpreted on the basis of the plurality of intents.

The speech recognition method may further include: generating a plurality of instruction sentence formulas by combining the plurality of intents; generating a plurality of derivative sentences on the basis of the plurality of instruction sentence formulas; and comparing the plurality of derivative sentences with a plurality of pieces of speech command data registered in a server, to find matching speech command data in the comparison.

The speech recognition method may further include: generating a plurality of scenarios operable by the home appliance on the basis of a function and a specification of the home appliance; and generating the plurality of instruction sentence formulas each corresponding to one of the plurality of scenarios.

In the comparing of the plurality of derivative sentences with the plurality of pieces of speech command data registered in the server, the speech command data having a higher priority may be compared first.

The speech command data representing an operation having a higher frequency of use may be assigned a higher priority.

The speech recognition method may further include: extracting a plurality of control values for controlling the home appliance from a result of the interpretation of the speech command; and transmitting a speech recognition result including the plurality of control values to the home appliance, wherein the speech recognition result includes at least one of a function and an option of the home appliance, a hardware value of the home appliance, a value required for control of the home appliance, information indicating whether the speech recognition result is successful, or text information guided to a user.

The home appliance may include at least one of a refrigerator, a washing machine, a cooking device, an air conditioner, or a robot cleaner.

Advantageous Effects

According to the above-described aspects, a plurality setting items for device control can be easily and rapidly set by collectively setting the plurality of setting items for device control through an utterance of a single sentence in the form of natural language.

BRIEF DESCRIPTION OF THE DRAWINGS

FIG. 4 is a diagram illustrating an example of a speech command protocol that is applied to a speech recognition technology according to an embodiment of the disclosure.

DETAILED DESCRIPTION

Figure 1:
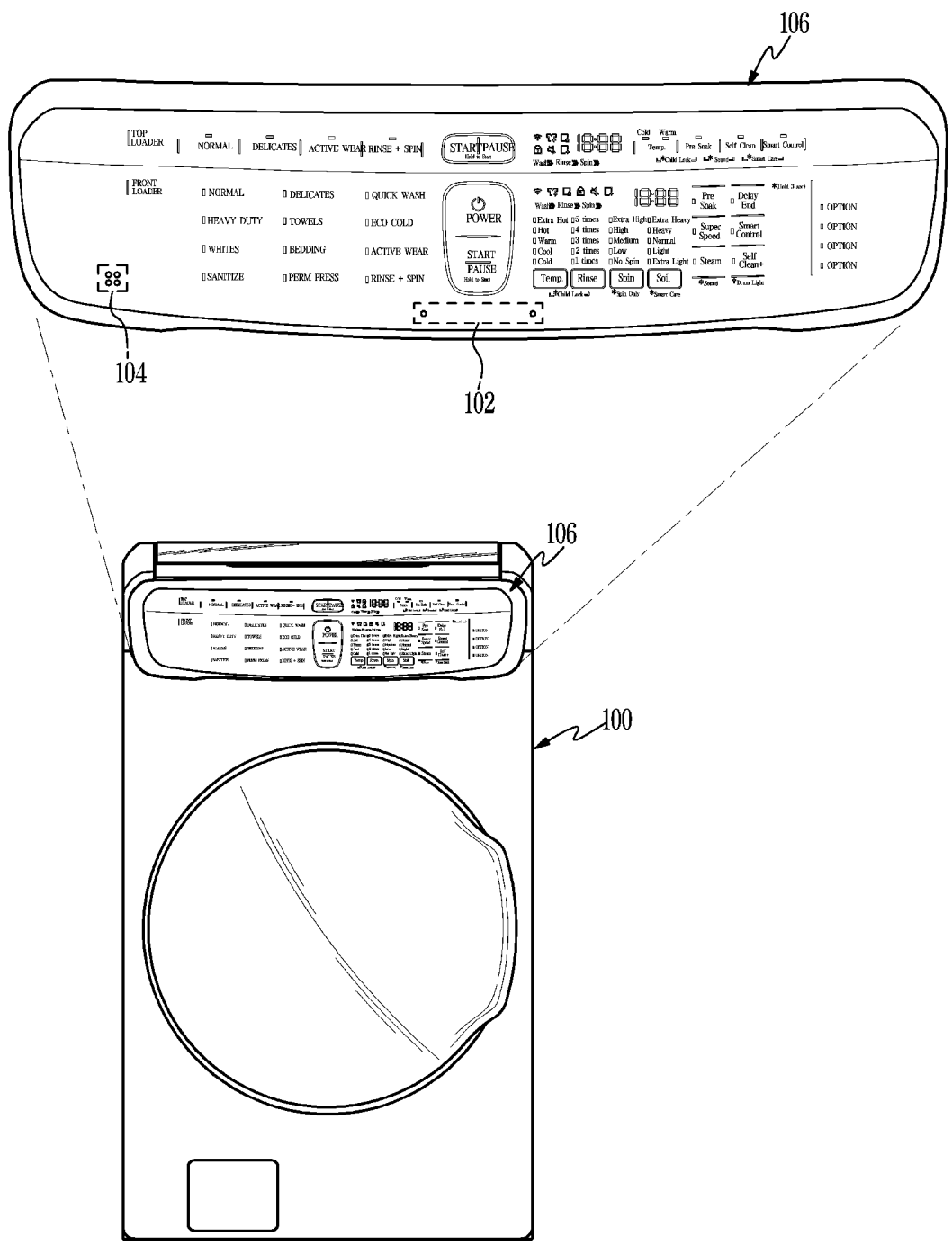
FIG. 1 is a diagram illustrating a home appliance that employs speech recognition technology according to an embodiment.

FIG. 1 is a diagram illustrating a home appliance 100 that employs speech recognition technology according to an embodiment. The speech recognition technology according to the embodiment of the disclosure may be applied to any device, such as a vehicle, a computer, industrial facility, a mobile device as well as a home appliance, on which a speech recognition module is mounted to be controlled through a speech command.

In FIG. 1, a washing machine is illustrated as an example of the home appliance 100. The home appliance to which the speech recognition technology according to the embodiment of the disclosure may be applied is not limited to a washing machine, and the application thereof may be expanded to other types of home appliances, such as an oven or a robot cleaner.

Referring to FIG. 1, the home appliance 100 is provided with a microphone hole 102 and a speaker hole 104. The microphone hole 102 is provided at a position corresponding to a position at which a microphone (306 in FIG. 3) is installed. A speech signal uttered by a user (a speaker) is transmitted to the microphone (306 in FIG. 3) through the microphone hole 102. The speaker hole 104 is provided at a position corresponding to a position at which a speaker (312 in FIG. 3) is installed. An acoustic signal generated by the home appliance 100 may be output to the outside through the speaker hole 104.

Figure 3:
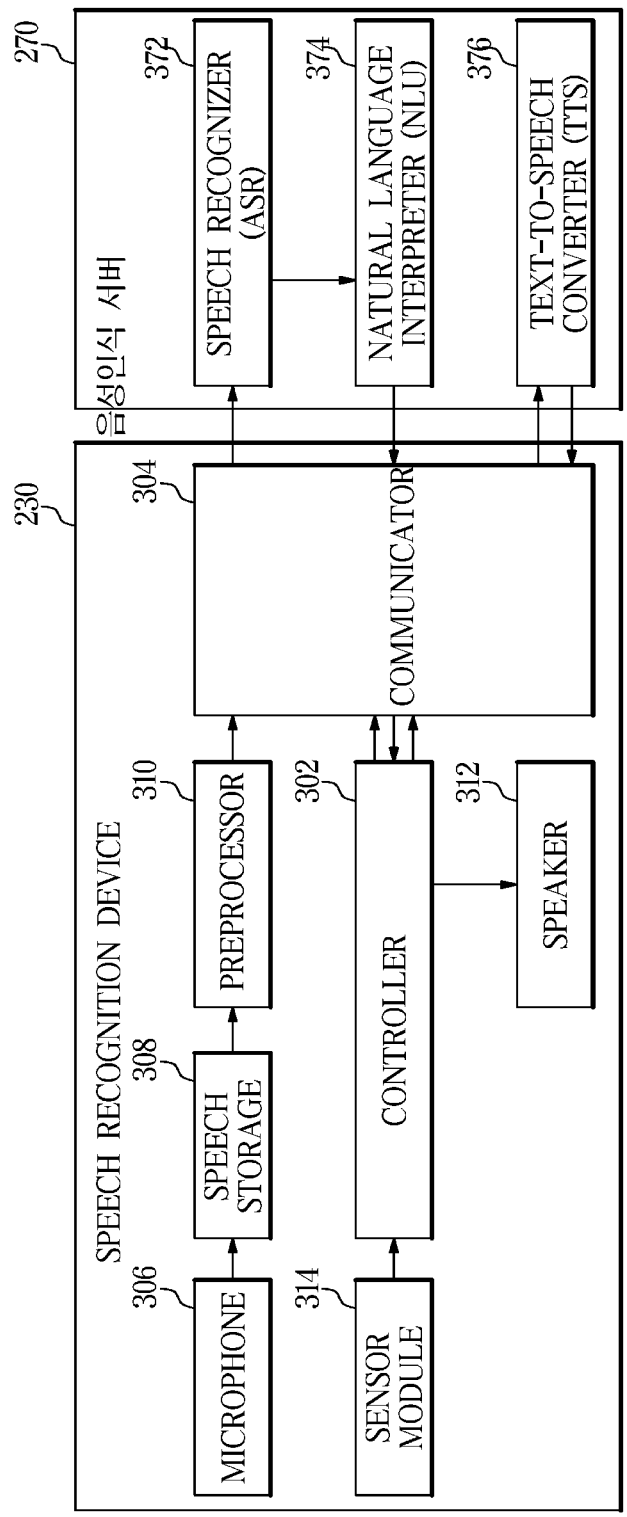
FIG. 3 is a detailed diagram illustrating a configuration of the speech recognition system shown in FIG. 2.

The positions of the microphone hole 102 and the speaker hole 104 are determined by the positions of the microphone (306 in FIG. 3) and the speaker (312 in FIG. 3). The microphone (306 in FIG. 3) and the speaker (312 in FIG. 3) may be installed at any position in a main body of the home appliance 100. Preferably, the microphone (306 in FIG. 3) and the speaker (312 in FIG. 3) may be installed on a control panel 106 provided on a front upper portion of the main body of the home appliance 100, and the microphone hole 102 and the speaker hole 104 may be formed at positions corresponding to the microphone (306 in FIG. 3) and the speaker (312 in FIG. 3), respectively, so that when the user (the speaker) stands in front of the home appliance 100, the ears and the mouth of the user (the speaker) may approach the microphone hole 102 and the speaker hole 104.

Figure 2:
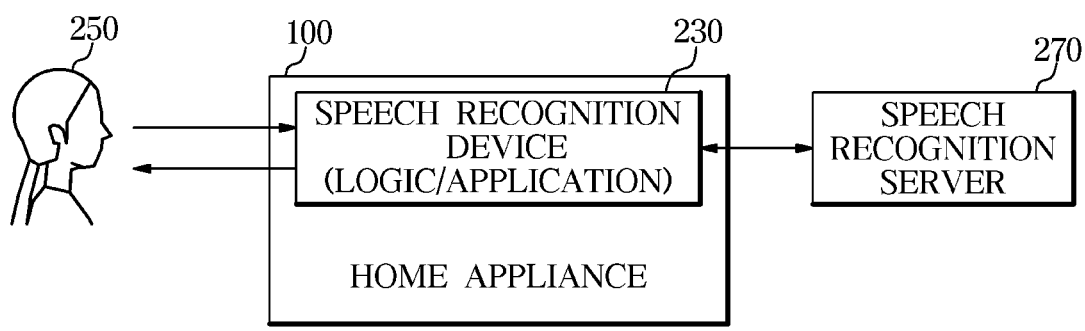
FIG. 2 is a diagram illustrating a speech recognition system that employs speech recognition technology according to an embodiment of the disclosure.

FIG. 2 is a diagram illustrating a speech recognition system that employs a speech recognition technology according to an embodiment of the disclosure. As shown in FIG. 2, a speech command generated by an utterance of a user (a speaker) 250 is input to a speech recognition device 230 of the home appliance 100, is subjected to a series of signal processing, and then is transmitted to a speech recognition server 270 at a remote site. The speech recognition device 230 may be provided in the form of logic in a microprocessor or in the form of speech recognition application software. In the speech recognition server 270, the speech command is subject to interpretation and conversion. The speech command interpreted and converted in the speech recognition server 270 is provided to the home appliance 100 again such that the home appliance 100 is subject to control corresponding to the speech command.

The speech recognition server 270 is provided at a remote site to enable communication with the home appliance 100. As another embodiment, the speech recognition server 270 may be installed in the home appliance 100 and operated. As another embodiment, a mobile device (for example, a smartphone, such as Samsung's Galaxy series) may be operated as the speech recognition server.

FIG. 3 is a detailed diagram illustrating a configuration of the speech recognition system shown in FIG. 2. The speech recognition device 230 provided in the home appliance 100 includes a controller 302, a communicator 304, a microphone 306, a speech storage 308, a preprocessor 310, a speaker 312, and a sensor module 314. The speech recognition server 270 provided at a remote site may include a speech recognizer (automatic speech recognition, ASR) 372, a natural language interpreter (natural language understanding, NLU) 374, and a text-to-speech converter (text to speech, TTS) 376.

In the speech recognition device 230, the controller 302 controls overall operations of the speech recognition device 230. For example, the controller 302 receives a speech command generated by an utterance of a user (a speaker), performs a series of signal processing on the speech command, and transmits the speech command on which the signal processing is completed to the speech recognition server 270 at the remote site through the communicator 304. In addition, the controller 302 receives a speech command resulting from interpretation and conversion from the speech recognition server 270, and transmits the received speech command to another controller of the home appliance 100 such that the home appliance 100 is subject to control corresponding the speech command.

The communicator 304 allows the speech recognition device 230 of the home appliance 100 and the speech recognition server 270 at the remote site to communicate with each other. The communicator 304 may be a communication device for wired communication and wireless communication. The communication between the speech recognition device 230 of the home appliance 100 and the speech recognition server 270 at the remote site may use both a wired communication network and a wireless communication network. For wireless networks, the existing infrastructures, such as Long Term Evolution (LTE), may be used. Alternatively, Wi-Fi or Ethernet may be used. Alternatively, the home appliance 100 and the speech recognition server 270 may communicate with each other using a hotspot function of a mobile device. Alternatively, the home appliance 100 and the speech recognition server 270 may communicate with each other through a short range communication network, such as Bluetooth or near field communication (NFC). When communicating through a short range communication network, the speech recognition server 270 needs to be located close to the home appliance 100.

The microphone 306 is a device for receiving a speech signal uttered by a user (a speaker). An acoustic signal generated by the utterance by the user (the speaker) is collected by the microphone 306 and converted into an electrical signal.

The speech storage 308 serves as a buffer for temporarily storing the acoustic signals collected by the microphone 306.

The preprocessor 310 performs preprocessing on the acoustic signals stored in the speech storage 308. The preprocessing of the acoustic signals may include noise removal or signal amplification.

The speaker 312 is a device for outputting an acoustic signal generated by the home appliance 100. The acoustic signal output through the speaker 312 may include a beep sound or a warning sound indicating the state of the home appliance 100. In addition, the acoustic signal output through the speaker 312 may be a response to the speech command of the user or may be an acoustic signal for providing a result of performing the speech command.

The sensor module 314 is provided to detect various operating states of the home appliance 100. For example, the sensor module 314 may include a door sensor capable of detecting a door opening of the home appliance 100. In addition, the sensor module 314 may include a temperature sensor for measuring the water temperature of the home appliance 100.

In the speech recognition server 270, the speech recognizer 372 recognizes a speech command generated by the utterance of the user (the speaker) and converts the speech command into text data.

The natural language interpreter 374 is a device for analyzing content of the speech command generated by the user (speaker) utterance through natural language processing and for extracting an intent of the user (the speaker). Here, the intent of the user (speaker) refers to an independent control item intended by the user. For example, the speech command "start with a standard washing course, three times of rinsing, and delicate drying" may include four intents 'washing course', 'the number of rinsing times', 'the degree of dryness' and 'start'.

The text-to-speech converter 376 is a device provided to convert text data into a speech signal (Text to Speech). The speech recognition server 270 stores various pieces of text data related to the home appliance 100. The text-to-speech converter 376 converts text data selected from among the various pieces of text data into an acoustic signal and transmits the acoustic signal to the speech recognition device 230 of the home appliance 100. The speech recognition device 230 of the home appliance 100 may output the acoustic signal transmitted from the text-to-speech converter 376 of the speech recognition server 270 through the speaker 312 such that the user hears the acoustic signal.

In the speech recognition system according to the embodiment of the disclosure, the natural language interpreter 374 of the speech recognition server 270 compares the text data converted by the speech recognizer 372 with various pieces of text data secured by the natural language interpreter 374, and checks the existence of a matching sentence in the comparison. For example, when a user (a speaker) generates a speech command by uttering "start with a standard washing course, three times of rinsing and delicate drying", the natural language interpreter 374 searches for text data that matches or closes to the utterance "start with a standard washing course, three times of rinsing, and delicate drying" among the pieces of text data secured by the natural language interpreter 374, and identifies the existence of the matching text data. In this case, a rule name (a command name), based on which the search is performed, is "start cycle and rinse and dryer".

The pieces of text data secured in the speech recognition server 270 include instruction sentence formulas for understanding and operating speech commands. Some examples of the instruction sentence formulas are described as in (A) to (D) below. The instruction sentence formulas described below may be provided using multiple intent identification technique. As described above, the speech command "start with a standard washing course, three times of rinsing, and delicate drying" includes four intents 'washing course', 'the number of rinsing times', 'the degree of dryness' and 'start'. Thus, combining the four intents may produce various instruction sentence formulas. However, when only instruction sentence formulas expressed as a single sentence in the form of natural language are adopted, the instruction sentence formulas may be summarized as follows.

(A) <washer_cycle> course drying <dryer_number> course rinsing <rinse_number> times {concept_start}
(B) <washer_cycle> course rinsing <rinse_number> times drying <dryer_number> course {concept_start}
(C) <washer_cycle> course rinsing <rinse_number> times drying <dryer_number> course {concept_setting}
(D) drying <dryer_number> course rinsing <rinse_number> times <washer_cycle> course {concept_start}

Among the instruction sentence formulas, the instruction sentence formula corresponding to "start cycle and rinse and dryer" is the instruction sentence formula (B). Derivative sentences that may be generated from the instruction sentence formula (B) on the basis of multiple intent identification technology and natural language rules may be represented as (B1) to (B5) below. Although all the derivative sentences (B1) to (B5) have sentence structures and expressions that are close to natural language, it can be seen that a derivative sentence that matches the original speech command "start with a standard washing course, three times of rinsing, and delicate drying" is the sentence (B4). When there is no matching derivative sentence, the most similar derivative sentence is selected.

(B1) start with a standard washing course, 0 times of rinsing, and delicate drying
(B2) start with a standard washing course, one time of rinsing, and delicate drying
(B3) start with a standard washing course, two times of rinsing, and delicate drying
*(B4) start with a standard washing course, three times of rinsing, and delicate drying
(B5) start with a standard washing course, two times of rinsing, and delicate drying The pieces of text data secured by the natural language interpreter 374 may be assigned a priority for increasing the recognition rate. A higher priority is assigned to text data representing a general operation having a higher frequency of use in the home appliance 100. For example, in the case of the home appliance 100 implemented as a washing machine, a general type of washing operation includes 'the washing course', 'the number of rinsing times', and 'the degree of dryness', and thus text data including 'the washing course', 'the number of rinsing times', and 'the degree of drying' has a higher priority. In contrast, a washing operation that does not include 'the number of rinsing times' or 'the degree of dryness' is not a general operation, and thus the corresponding text data has a lower priority. The natural language interpreter 374 may perform the comparison starting from the text data having a highest priority, so that a matching text data may be found more quickly and accurately.

In the result of the comparison, the existence of the matching text data represents that text data of instructions corresponding to the speech signal spoken by the user (speaker) exists in the natural language interpreter 374. The natural language interpreter 374 checks the rule of the corresponding instructions.

A rule of instructions is implemented differently according to an operation scenario of the home appliance 100. First, exceptions are checked according to the functions and specifications of the home appliance 100. For example, when the user (the speaker) says "Start a standard washing course", a rule of the instructions is found and the rule of the instructions "Start Cycle Washer" is secured. Subsequently, it is checked whether the 'standard washing course' uttered by the user (the speaker) is a washing course existing in the home appliance 100 on the basis of the performance and the requirements of the home appliance 100. When the 'standard washing course' is a washing course existing in the home appliance 100, the current operation state of the home appliance 100 is checked. Information about the current state of the home appliance 100 is provided from the speech recognition device 230 of the home appliance 100.

When it is determined as a result of checking the current operating state of the home appliance 100 that the current state of the home appliance 100 is a state in which a 'standard washing course' is performable, the 'standard washing course' is allowed to be performed according to the speech command. On the contrary, when the current state of the home appliance 100 is a state in which the 'standard washing course' is not performable, a notification indicating that the 'standard washing course' is not performable is output through the speaker 312 (or a display) to inform the user of the current state.

When it is determined as a result of checking the exceptions that the speech command is a normal speech command, the natural language interpreter 374 transmits a speech recognition result to the speech recognition device 230 of the home appliance 100. The speech recognition result may include a function and an option of the home appliance 100, a hardware value of the home appliance 100, a value required for control of the home appliance 100, information indicating whether the speech recognition result succeeds, or text information (text-to-speech (TTS) information) guided to the user.

Since the speech command generated by the speech recognition device 230 of the home appliance 100 and the speech recognition server 270 on the basis of the user (speaker) utterance is recognized and executed by the home appliance 100, the user (speaker) may set an intended operation (or input a control command) without directly manipulating the home appliance 100.

FIG. 4 is a diagram illustrating an example of a speech command protocol that is applied to a speech recognition technology according to an embodiment of the disclosure. In the speech recognition system according to the embodiment of the disclosure, even when a speech command generated by a user (speaker) utterance is a single sentence in the form of natural language including a plurality of consecutive setting items, the speech command may be rapidly and accurately interpreted and converted. For example, the plurality of setting items may include an operation control item and an option setting item. The speech recognition technology according to the embodiment of the disclosure may allow a user (speaker) to consecutively utter a plurality of operation control items and a plurality of option setting items in a single sentence, apply a predetermined rule to the plurality of operation control items and the plurality of option setting items, and perform natural language processing using the natural language interpreter 374, so that the contents of the speech command of the user (speaker) may be accurately identified.

The speech command protocol shown in FIG. 4 includes <function>, <option>, and <hardware control value>. <Function> is to classify various functions provided in the home appliance 100, <option> is to classify a value or state that may be set for each function, and <hardware control value> is to represent an option for each function as a hexadecimal number. <Hardware control value> may be represented in other forms instead of hexadecimal.

In FIG. 4, it is assumed that the home appliance 100 is a washing machine and the user (speaker) utters a speech command "start with a standard washing course, three times of rinsing, and delicate drying". The speech command of the user (speaker) includes four intents of 'course', 'rinsing (the number of rinsing times)', 'dryness (the degree of dryness)' and 'operation control'.

'Course' is to select a washing course, and may include courses, such as a standard washing, a wool washing, and a large laundry washing. The hardware control value representing the standard washing selected by the user (speaker) is "0x00".

'Rinsing' is to select the number of rinsing times of laundry, for example, a certain number of rinsing times, from one to five, may be selected. The hardware control value representing three times of rinsing selected by the user (speaker) is "0x0f".

'Dryness' is to select the degree of drying laundry, for example, one of the degrees of dryness, from among general drying, high temperature drying, delicate drying, and the like, may be selected. The hardware control value representing the delicate drying selected by the user (the speaker) is "0xA0".

'Operation control' is to set the operation of the home appliance 100. For example, one operation, from among a start and an end of washing, a pause, and the like, may be selected. The hardware control value representing the start of washing selected by the user (the speaker) is "0x43".

When the user (speaker) utters "start with a standard washing course, three times of rinsing, and delicate drying", the speech recognition device 230 of the home appliance 100 in cooperation with the speech recognition server 270 may analyze that the speech command of the user (speaker) includes <function>, <option>, and <hardware control value> as shown in FIG. 4, and control the home appliance 100 to perform a standard washing course including three times of rinsing cycles and a delicate drying cycle as analyzed.

In the case of the conventional home appliances, in order to set <function> and <option> on the basis of speech recognition technology, a primary speech command is generated to set a function, and then a secondary speech command is generated to set an option. In other words, for each setting item, an independent (separate) speech command needs to be generated. However, the speech recognition system according to the embodiment of the disclosure may generate a speech command including a plurality of desired <functions> and a plurality of desired <options> using only a single sentence structure speech command in the form of a natural language including the plurality of <functions> and the plurality of <options>.

Figure 5:
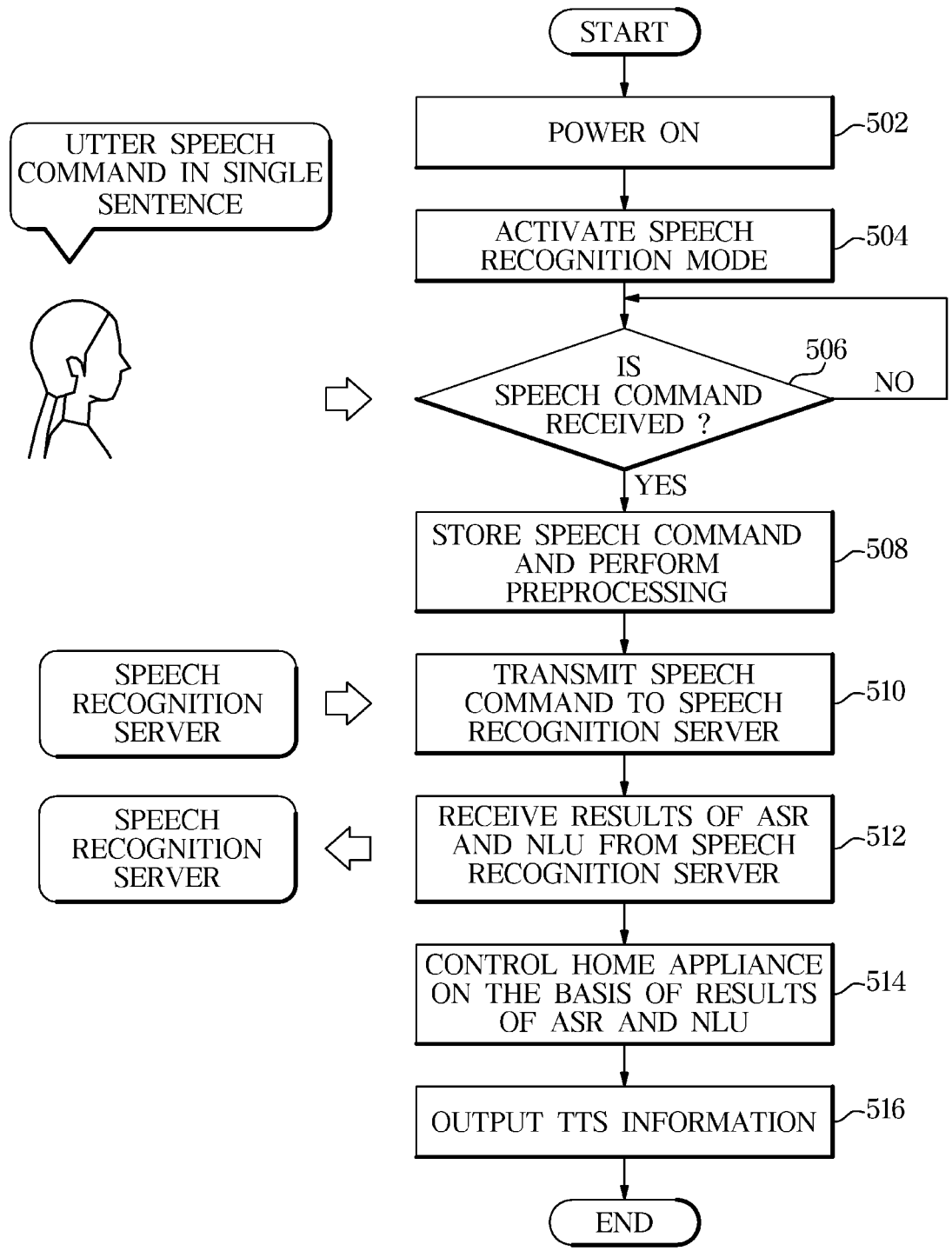
FIG. 5 is a diagram illustrating a speech recognition control method according to an embodiment of the disclosure.

FIG. 5 is a diagram illustrating a speech recognition control method according to an embodiment of the disclosure.

First, the home appliance 100 may be powered on through manipulation of a power button by a user, so that power is supplied to each element of the home appliance 100 (502).

When the home appliance 100 is in a power-on state, a speech recognition mode may be activated by at least one of the following two methods (504). Without a separate process for activating the speech recognition mode, a normal conversation occurring around the home appliance 100 may be erroneously recognized by the speech recognition function as a control command input by a user. Therefore, in order to prevent such misrecognition, a separate process for activating a speech recognition mode is required.

The first method for activating the speech recognition mode may operate in a way to activate the speech recognition mode through a speech trigger. That is, when the user utters a predetermined specific speech, the home appliance 100 may recognize the utterance of the predetermined specific speech, so that the speech recognition mode is activated. The second method for activating the speech recognition mode may operate in a way that the user directly manipulates a speech recognition icon or a speech recognition button provided on the home appliance 100 to activate the speech recognition mode.

When the speech recognition mode is activated, the controller 302 of the speech recognition device 230, in a standby state, monitors whether a speech command is received (506).

When a speech command generated by the user (speaker) utterance is received through the microphone 306 (YES in operation 506), the received speech command is temporarily stored in the speech storage 308, and is preprocessed by the preprocessor 310 into a signal in which noise is removed or the magnitude is amplified (508).

The pre-processed speech command is transmitted to the speech recognition server 270 at a remote side through the communicator 304 (510). In the speech recognition server 270, a speech recognition process including speech recognition (ASR) and natural language interpretation (NLU) is performed on the speech command transmitted from the home appliance 100. The speech recognition process performed by the speech recognition server 270 has been described above in detail with reference to FIG. 3. A result of the speech recognition process performed by the speech recognition server 270 (that is, results of ASR and NLU, and TTS) is transmitted to the controller 302 of the home appliance 100.

The home appliance 100 receives the result of the speech recognition process (the results of the ASR, the NLU, and the TTS) from the speech recognition server 270 (512). The result of the speech recognition process may include a function and an option of the home appliance 100, a hardware value of the home appliance 100, a value required for control of the home appliance 100, information indicating whether the result is successful, and text information (TTS information) that is to be guided the user.

The controller 302 of the speech recognition device 230 of the home appliance 100 provides required data to other controllers in the home appliance 100 such that the home appliance 100 is subject to control based on the result of the speech recognition process received from the speech recognition server 270 (the results of the ASR, the NLU, the TTS) according to the speech command (514).

When a task based on the speech command is in progress or completed, the controller 302 selects text information (TTS information) included in the result of the speech recognition process received from the speech recognition server 270 and outputs a speech guidance corresponding to the current state of the home appliance 100 through the speaker 312 (516). The speech guidance may be provided to notify a progress of a task currently being performed in the home appliance 100 or to notify the completion of the task. When the home appliance 100 is provided with a display, a guide message may be output in the form of text or graphics through the display.

Figure 6:
FIG. 6 is a diagram illustrating a speech recognition scenario of a washing machine that employs a speech recognition technology according to an embodiment of the disclosure.

FIG. 6 is a diagram illustrating a speech recognition scenario of a washing machine that employs a speech recognition technology according to an embodiment of the disclosure. As shown in FIG. 6, when a user (speaker) generates a speech command, such as "Wash laundry with a baby clothes course by 6 p.m." through utterance of a single sentence, a washing machine 600 having received the speech command extracts a plurality of control values through multiple-intent determination of the single sentence type speech command of the user (speaker) in cooperation with the speech recognition server 270, and outputs a speech message "Yes, I will finish washing by 6 p.m." in response to the speech command of the user (speaker) through the speaker 312. Such recognition of a speech command in the form of natural language and generation of a speech message may be performed by extracting a plurality of control values included in the single sentence form speech command through multiple-intent determination of the speech recognition technology according to the embodiment of the disclosure.

Figure 7:
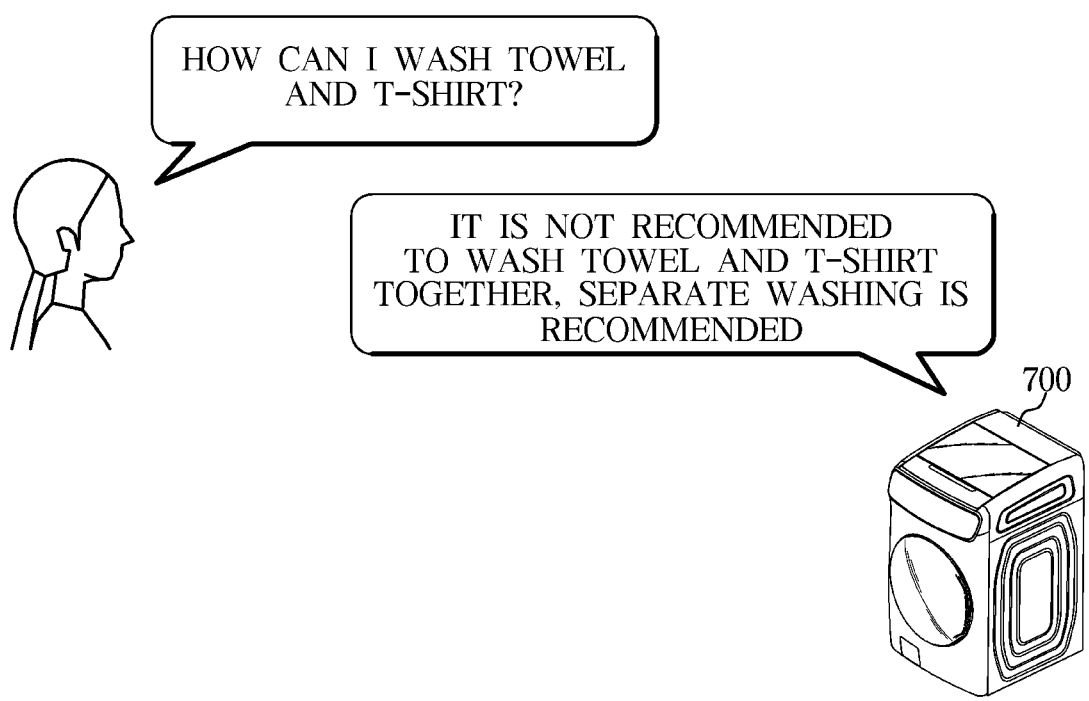
FIG. 7 is a diagram illustrating another speech recognition scenario of a washing machine that employs a speech recognition technology according to an embodiment of the disclosure.

FIG. 7 is a diagram illustrating another speech recognition scenario of a washing machine that employs a speech recognition technology according to an embodiment of the disclosure. As shown in FIG. 7, when the user (the speaker) generates a speech command "How can I wash a towel and a T-shirt" through utterance of a single sentence, a washing machine 700 having received the speech command extracts a plurality of control values through multiple-intent determination of the single sentence type speech command of the user (speaker) in cooperation with the speech recognition server 270, and outputs a speech message "it is not recommended to wash a towel and a T-shirt together, separate washing is recommended." in response to the speech command of the user (speaker) through the speaker 312. Such recognition of a speech command in the form of natural language and generation of a speech message may be performed by extracting a plurality of control values included in the single sentence form speech command through multiple-intent determination of the speech recognition technology according to the embodiment of the disclosure.

Figure 8:
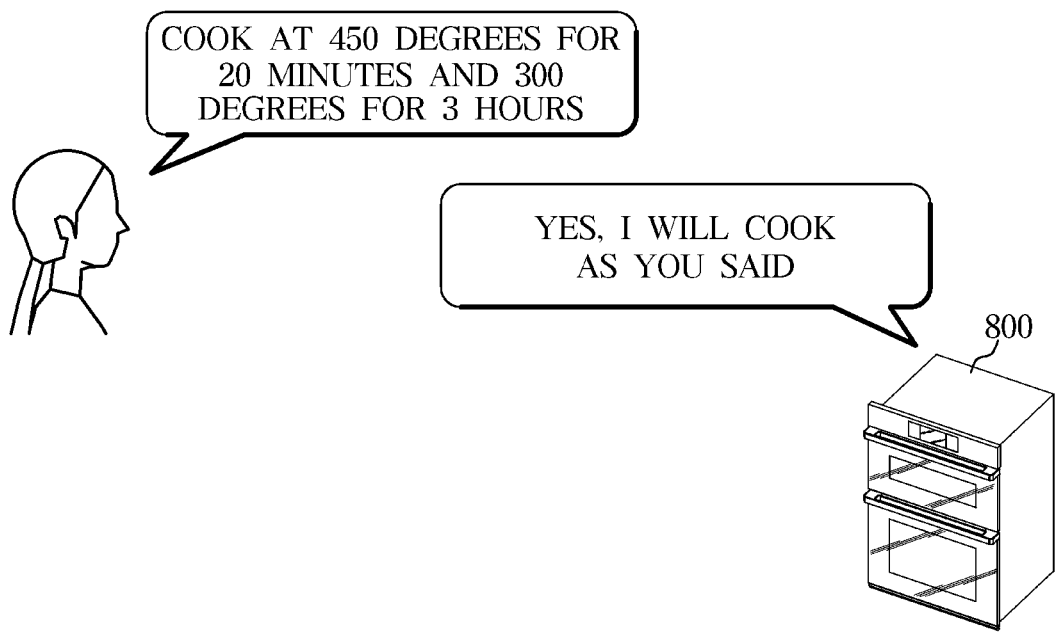
FIG. 8 is a diagram illustrating a speech recognition scenario of an oven that employs a speech recognition technology according to an embodiment of the disclosure.

FIG. 8 is a diagram illustrating a speech recognition scenario of an oven that employs a speech recognition technology according to an embodiment of the disclosure.

As shown in FIG. 8, when a user (speaker) generates a speech command "Cook at 450 degrees for 20 minutes and 300 degrees for 3 hours" through a single sentence, an oven 800 having received the speech command extracts a plurality of control values through multiple-intent determination of the single sentence type speech command of the user (speaker) in cooperation with the speech recognition server 270, and outputs a speech message "Yes, I will cook as you said" in response to the speech command of the user (speaker) through the speaker 312. Such recognition of a speech command in the form of natural language and generation of a speech message may be performed by extracting a plurality of control values included in the single sentence form speech command through multiple-intent determination of the speech recognition technology according to the embodiment of the disclosure.

Figure 9:
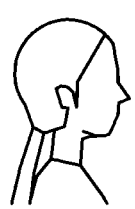
FIG. 9 is a diagram illustrating another speech recognition scenario of an oven that employs a speech recognition technology according to an embodiment of the disclosure.
Figure 9:
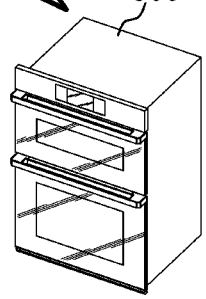

FIG. 9 is a diagram illustrating another speech recognition scenario of an oven that employs a speech recognition technology according to an embodiment of the disclosure. As shown in FIG. 9, when the user (speaker) generates a speech command "I have sweet potato, honey, whipped-cream, and Castella, what could I cook" through utterance of a single sentence, an oven 900 having received the speech command extracts a plurality of control values through multiple-intent determination of the single sentence type speech command of the user (speaker) in cooperation with the speech recognition server 270, and outputs a speech message "A sweet potato cake is recommended. I will let you know a detailed recipe if you want." in response to the speech command of the user (speaker) through the speaker 312. Such recognition of a speech command in the form of natural language and generation of a speech message may be performed by extracting a plurality of control values included in the single sentence form speech command through multiple-intent determination of the speech recognition technology according to the embodiment of the disclosure.

Figure 10:
FIG. 10 is a diagram illustrating a speech recognition scenario of a robot cleaner that employs a speech recognition technology according to an embodiment of the disclosure.

FIG. 10 is a diagram illustrating a speech recognition scenario of a robot cleaner that employs a speech recognition technology according to an embodiment of the disclosure. As shown in FIG. 10, when a user (speaker) generates a speech command "Clean the living room, the main room, and the kitchen" through utterance of a single sentence, a robot cleaner 1000 having received the speech command extracts a plurality of control values through multiple-intent determination of the single sentence type speech command of the user (speaker) in cooperation with the speech recognition server 270, and outputs a speech message "Yes. I'll clean the area you've talked about" in response to the speech command of the user (speaker) through the speaker 312. Such recognition of a speech command in the form of natural language and generation of a speech message may be performed by extracting a plurality of control values included in the single sentence form speech command through multiple-intent determination of the speech recognition technology according to the embodiment of the disclosure.

Figure 11:
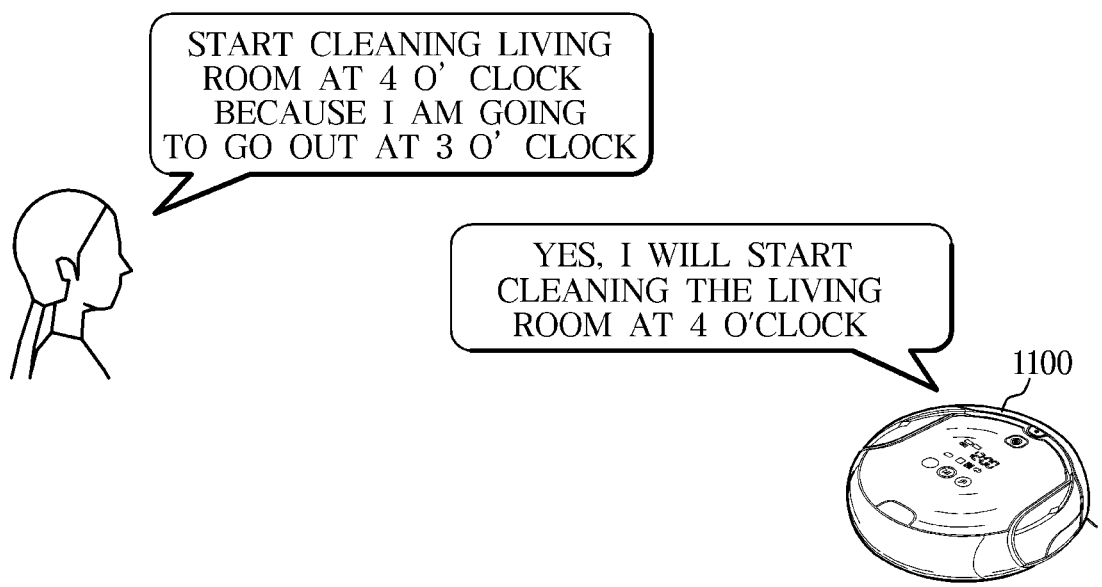
FIG. 11 is a diagram illustrating another speech recognition scenario of a robot cleaner that employs a speech recognition technology according to an embodiment of the disclosure.

FIG. 11 is a diagram illustrating another speech recognition scenario of a robot cleaner that employs a speech recognition technology according to an embodiment of the disclosure. As shown in FIG. 11, when a user (speaker) generates a speech command "start cleaning the living room at 4 o'clock because I am going to go out at 3 o'clock" through utterance of a single sentence, a robot cleaner 1100 having received the speech command extracts a plurality of control values through multiple-intent determination of the single sentence type speech command of the user (speaker)

in cooperation with the speech recognition server 270, and outputs a speech message "Yes, I will start cleaning the living room at 4 o'clock." in response to the speech command of the user (speaker) through the speaker 312. Such recognition of a speech command in the form of natural language and generation of a speech message may be performed by extracting a plurality of control values included in the single sentence form speech command through multiple-intent determination of the speech recognition technology according to the embodiment of the disclosure.

The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

The invention claimed is:

1. A speech recognition system for a home appliance, comprising:
    the home appliance configured to:
        activate a speech recognition device installed in the home appliance based on receiving a predetermined triggering word from a user, and
        receive an utterance of a single sentence including a plurality of intents for control of the home appliance while the speech recognition device is activated; and
    a server configured to:
        receive the utterance from the home appliance,
        interpret the utterance through a multiple intent determination including a plurality of functions to be performed by the home appliance and a plurality of options each of which is a value to be set in the home appliance when the home appliance performs the function, wherein a higher priority for recognition of functions in the multiple intent determination is assigned to data representing operations having a higher frequency of use in the home appliance, and
        transmit a control command to the home appliance based on the multiple intent determination.

2. A speech recognition method for a home appliance, comprising:
    activating a speech recognition device installed in the home appliance based on receiving a predetermined triggering word from a user;
    receiving an utterance of a single sentence including a plurality of intents for control of the home appliance while the speech recognition device is activated;
    transmitting the utterance to an external speech recognition server; and
    receiving a control command from the external speech recognition server,
    wherein the control command comprises a plurality of functions to be performed by the home appliance and a plurality of options each of which is a value to be set in the home appliance when the home appliance performs the function, and
    wherein a higher priority for recognition of the plurality of functions in a multiple intent determination is assigned to data representing operations having a higher frequency of use in the home appliance.

* * * * *